(12) United States Patent
Teshima et al.

(10) Patent No.: US 9,034,526 B2
(45) Date of Patent: May 19, 2015

(54) GARNET-TYPE SOLID ELECTROLYTE, SECONDARY BATTERY CONTAINING GARNET-TYPE SOLID ELECTROLYTE, AND METHOD OF PRODUCING GARNET-TYPE SOLID ELECTROLYTE

(75) Inventors: Katsuya Teshima, Nagano (JP); Masato Hozumi, Susono (JP)

(73) Assignees: TOYOTA JIDOSHA KABUSHIKI KAISHA, Toyota (JP); SHINSHU UNIVERSITY, Nagano (JP)

( * ) Notice: Subject to any disclaimer, the term of this patent is extended or adjusted under 35 U.S.C. 154(b) by 22 days.

(21) Appl. No.: 13/984,656

(22) PCT Filed: Feb. 23, 2012

(86) PCT No.: PCT/IB2012/000325
§ 371 (c)(1),
(2), (4) Date: Aug. 9, 2013

(87) PCT Pub. No.: WO2012/114193
PCT Pub. Date: Aug. 30, 2012

(65) Prior Publication Data
US 2013/0323604 A1 Dec. 5, 2013

(30) Foreign Application Priority Data
Feb. 24, 2011 (JP) ................................. 2011-038780

(51) Int. Cl.
*H01M 10/0562* (2010.01)
*C01G 19/00* (2006.01)
(Continued)

(52) U.S. Cl.
CPC ......... *H01M 10/0562* (2013.01); *C01G 19/006* (2013.01); *C01G 25/006* (2013.01);
(Continued)

(58) Field of Classification Search
USPC ......................................................... 429/322
See application file for complete search history.

(56) References Cited

U.S. PATENT DOCUMENTS 7,510,804 B2 * 3/2009 Hamano et al. ............. 429/231.1
8,309,258 B2 * 11/2012 Kanamura et al. ............. 429/322
(Continued)

FOREIGN PATENT DOCUMENTS

JP A-2007-528108 10/2007
JP A-2010-45019 2/2010
(Continued)

OTHER PUBLICATIONS

Thangadurai et al., "Crystal Structure Revision and Identification of $Li^+$-Ion Migration Pathways in the Garnet-like $Li_5La_3M_2O_{12}$ (M=Nb, Ta) Oxides," *Chem. Mater.*, 2004, pp. 2998-3006, vol. 16.

*Primary Examiner* — Patrick Ryan
*Assistant Examiner* — Lucas J O'Donnell
(74) *Attorney, Agent, or Firm* — Oliff PLC

(57) ABSTRACT

A garnet-type solid electrolyte contains a crystal having (110) face, (1-10) face, (112) face, (1-12) face, and (11-2) face, the garnet-type solid electrolyte being $Li_7La_3Zr_2O_{12}$. A battery includes a solid electrolyte interposed between a positive and a negative electrode, the solid electrolyte being the garnet-type solid electrolyte. A method of producing a garnet-type solid electrolyte represented by a composition formula $Li_7La_3Zr_2O_{12}$ and has (110) face, (1-10) face, (112) face, (1-12) face, and (11-2) face as a crystal face, including a step of preparing a lithium-containing compound, a lanthanum-containing compound, and a zirconium-containing compound; a step of mixing these compounds such that a molar ratio among the elements satisfies Li:La:Zr=a:b:c (where a is from 120 to 160, b is from 1 to 5, and c is from 1 to 5); and a step of heating the mixture between 400 and 1,200° C.

10 Claims, 4 Drawing Sheets

(51) Int. Cl.

| | | |
|---|---|---|
| *C01G 25/00* | (2006.01) | |
| *C01G 27/00* | (2006.01) | |
| *C01G 29/00* | (2006.01) | |
| *C01G 30/00* | (2006.01) | |
| *C01G 33/00* | (2006.01) | |
| *C01G 35/00* | (2006.01) | |
| *C04B 35/01* | (2006.01) | |
| *C04B 35/453* | (2006.01) | |
| *C04B 35/457* | (2006.01) | |
| *C04B 35/486* | (2006.01) | |
| *C04B 35/495* | (2006.01) | |
| *H01M 10/052* | (2010.01) | |

(52) U.S. Cl.
CPC ............ *C01G27/006* (2013.01); *C01G 29/006* (2013.01); *C01G 30/002* (2013.01); *C01G 33/006* (2013.01); *C01G 35/006* (2013.01); *C01P 2002/52* (2013.01); *C01P 2002/72* (2013.01); *C01P 2004/03* (2013.01); *C01P 2006/40* (2013.01); *C04B 35/01* (2013.01); *C04B 35/453* (2013.01); *C04B 35/457* (2013.01); *C04B 35/486* (2013.01); *C04B 35/495* (2013.01); *C04B 2235/3201* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3227* (2013.01); *C04B 2235/3244* (2013.01); *C04B 2235/3251* (2013.01); *C04B 2235/3256* (2013.01); *C04B 2235/3258* (2013.01); *C04B 2235/326* (2013.01); *C04B 2235/3294* (2013.01); *C04B 2235/3298* (2013.01); *C04B 2235/444* (2013.01); *C04B 2235/764* (2013.01); *H01M 10/052* (2013.01); *Y02E 60/122* (2013.01)

(56) References Cited

U.S. PATENT DOCUMENTS

| | | | | |
|---|---|---|---|---|
| 8,658,317 | B2 * | 2/2014 | Weppner et al. | 429/321 |
| 8,795,902 | B2 * | 8/2014 | Yada et al. | 429/319 |
| 8,841,033 | B2 * | 9/2014 | Yamamura et al. | 429/322 |
| 8,877,388 | B1 * | 11/2014 | Ihlefeld et al. | 429/305 |
| 8,883,357 | B2 * | 11/2014 | Yoshida et al. | 429/322 |
| 8,945,779 | B2 * | 2/2015 | Yada et al. | 429/322 |
| 2007/0148553 | A1 | 6/2007 | Weppner | |
| 2010/0047696 | A1 * | 2/2010 | Yoshida et al. | 429/322 |
| 2010/0203383 | A1 * | 8/2010 | Weppner | 429/209 |

FOREIGN PATENT DOCUMENTS

| | | |
|---|---|---|
| JP | A-2010-102929 | 5/2010 |
| JP | A-2010-143785 | 7/2010 |
| JP | A-2010-202499 | 9/2010 |
| JP | A-2010-272344 | 12/2010 |
| WO | WO 2010/090301 A1 | 8/2010 |

* cited by examiner

CLASS =
a b c = ( 1.000, 1.000, 1.000 )
α β γ = ( 90.000, 90.000, 90.000 )
NUMBER OF FACES DATA = 36
EFFECTIVE NUMBER OF FACES = 36

GARNET-TYPE SOLID ELECTROLYTE, SECONDARY BATTERY CONTAINING GARNET-TYPE SOLID ELECTROLYTE, AND METHOD OF PRODUCING GARNET-TYPE SOLID ELECTROLYTE

BACKGROUND OF THE INVENTION

1. Field of the Invention

The invention relates to a high-crystallinity garnet-type solid electrolyte, a secondary battery that contains the garnet-type solid electrolyte, and a method of producing the garnet-type solid electrolyte.

2. Description of Related Art

A secondary battery is a battery that can undergo discharge by converting a decrement in chemical energy accompanying a chemical reaction into electrical energy and that can engage in storage (charging) by converting electrical energy into chemical energy when current flow occurs in the reverse direction from that during discharge. Among secondary batteries, the secondary batteries typified by lithium secondary batteries are, due to their high energy densities, widely used as power sources for notebook and laptop computers, portable phones, and so forth.

The reaction given by equation (I) below occurs at the negative electrode during the discharge of a lithium secondary battery when graphite (indicated below by C) is used as the negative electrode active material.

$$Li_xC \rightarrow C + xLi^+ + xe^- \qquad (I)$$

(0<x<1 in equation (I))

The electrons produced by the reaction according to equation (I) travel through an external circuit and do work at an external load and thereafter reach the positive electrode. The lithium ion (Li$^+$) produced by the reaction according to equation (I) migrates by electroosmosis from the negative electrode side to the positive electrode side within the electrolyte interposed between the negative electrode and positive electrode.

The reaction given by equation (II) below occurs at the positive electrode during discharge when lithium cobaltate (Li$_{1-x}$CoO$_2$) is used as the positive electrode active material.

$$Li_{1-x}CoO_2 + xLi^+ + xe^- \rightarrow LiCoO_2 \qquad (II)$$

(0<x<1 in equation (II))

During charging, the reverse reactions to equations (I) and (II) occur at the negative electrode and positive electrode, respectively, reproducing the lithium-loaded graphite (Li$_x$C) at the negative electrode by graphite intercalation and reproducing the lithium cobaltate (Li$_{1-x}$CoO$_2$) at the positive electrode and thus enabling discharge to occur again.

Among secondary batteries, all-solid-state secondary batteries, in which the electrodes and electrolyte are all solids, have been the subject of very active investigations in the last few years. And among all-solid-state secondary batteries, attention has been focused on the use of garnet-type ceramic materials as the solid electrolyte in all-solid-state lithium secondary batteries. Japanese Patent Application Publication No. 2010-045019 (JP-A-2010-045019) describes art related to an all-solid-state lithium secondary battery that includes a positive electrode, a negative electrode, and a solid electrolyte that contains a ceramic that has a garnet-type or garnet-like crystalline structure composed of Li, La, Zr, and O.

SUMMARY OF THE INVENTION

As a result of investigations by the inventors, it became clear that the garnet-type ceramic described in JP-A-2010-045019 has a low crystallinity, as shown in the examples provided below. It is also thought that the crystal faces of the garnet-type ceramic described in JP-A-2010-045019 are not adequately developed. The invention provides a high-crystallinity garnet-type solid electrolyte, a secondary battery that contains the garnet-type solid electrolyte, and a method of producing the garnet-type solid electrolyte.

A first aspect of the invention relates to a garnet-type solid electrolyte. The garnet-type solid electrolyte includes a crystal that has at least one crystal face selected from the {110} faces, {112} faces, {100} faces, {102} faces, {312} faces, {521} faces, and {611} faces.

The aforementioned crystal face in the garnet-type solid electrolyte may be at least one selected from the (110) face, (1-10) face, (112) face, (1-12) face, and (11-2) face.

In the garnet-type solid electrolyte, an area of one crystal face or a sum of areas of at least two crystal faces, selected from the {110} faces, {112} faces, {100} faces, {102} faces, {312} faces, {521} faces, and {611} faces, may be at least 30% with reference to a total surface area of the garnet-type solid electrolyte.

The garnet-type solid electrolyte may be at least one selected from Li$_7$La$_3$M$^1{}_2$O$_{12}$ (M$^1$=Zr, Hf, Sn), Li$_{5+x}$La$_3$Zr$_x$M$^2{}_{2-x}$O$_{12}$ (M$^2$=Nb, Ta; x=0 to 2), Li$_5$La$_3$M$^3{}_2$O$_{12}$ (M$^3$=Nb, Ta, Sb, Bi), and Li$_6$ALa$_2$Ta$_2$O$_{12}$ (A=Mg, Ca, Sr, Sr$_{0.5}$Ba$_{0.5}$, Ba).

The garnet-type solid electrolyte may be the garnet-type solid electrolyte Li$_7$La$_3$Zr$_2$O$_{12}$.

A second aspect of the invention relates to a battery. The battery includes a positive electrode, a negative electrode, and a solid electrolyte interposed between the positive electrode and the negative electrode, wherein the solid electrolyte is the garnet-type solid electrolyte described above. The solid electrolyte of the invention can be used in a secondary battery or in a primary battery.

A third aspect of the invention relates to a method of producing a garnet-type solid electrolyte that contains Li, La, Zr, and O. The production method has a preparation step in which a lithium-containing compound, a lanthanum-containing compound, and a zirconium-containing compound are each prepared; a mixing step in which a mixture is obtained by mixing the lithium-containing compound, lanthanum-containing compound, and zirconium-containing compound such that a molar ratio among the elements satisfies Li:La:Zr=a:b:c (where a is from 120 to 160, b is from 1 to 5, and c is from 1 to 5); and a heating step in which the mixture is heated at from 400 to 1,200° C.

The molar ratio in the production method may satisfy Li:La:Zr=a:b:c (where a is from 125 to 155, b is from 1 to 5, and c is from 1 to 5). The molar ratio in the production method may satisfy Li:La:Zr=a:b:c (where a is from 130 to 150, b is from 1 to 5, and c is from 1 to 5). In the production method, b may be 1.5 to 4.5 and c may be 1.5 to 4.5 in the molar ratio. In the production method, b may be 2 to 4 and c may be 2 to 4 in the molar ratio.

An auxiliary flux may be further added in the mixing step in the aforementioned production method, and when a total mass of the mixture containing the lithium-containing compound, the lanthanum-containing compound, the zirconium-containing compound, and the auxiliary flux is set to 100 mass %, a total content in the mixture of a compound or compounds acting as a flux is 5 to 95 mass %.

The total content may be 5 to 91 mass % in the production method. The total content may be 5.5 to 91 mass % in the production method. The mixture may be heated at 450 to 1,100° C. in the aforementioned heating step. The mixture may be heated at 500 to 1,000° C. in the aforementioned heating step in the production method.

The garnet-type solid electrolyte according to each of the aspects of the invention has fewer crystal defects and a higher crystallinity than garnet-type solid electrolyte according to the related art. In addition, by carrying out synthesis of the garnet-type solid electrolyte using a flux method, the production method according to the third aspect of the invention can synthesize a high-crystallinity garnet-type solid electrolyte in which the crystal faces are better developed than in garnet-type solid electrolyte according to the related art. Moreover, the production method according to the third aspect of the invention is a more convenient synthesis method than the synthesis method of the related art and also makes it possible to keep the synthesis temperature lower than in the synthesis method of the related art.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

1. The Garnet-Type Solid Electrolyte

Figure 1:
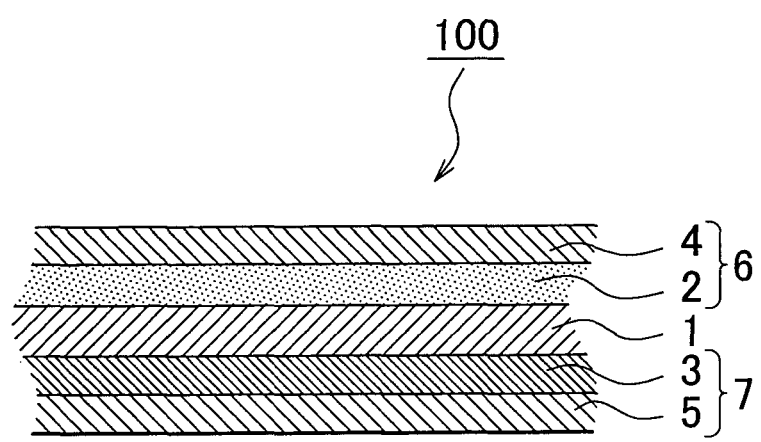
FIG. 1 is a diagram that gives an example of the layer structure of a secondary battery according to the invention, and schematically illustrates the cross section provided when a section is taken in the lamination direction.

The garnet-type solid electrolyte according to an aspect of the invention has at least one crystal face selected from the group consisting of the {110} faces, {112} faces, {100} faces, {102} faces, {312} faces, {521} faces, and {611} faces.

With regard to the representation of crystal faces in the Specification, families of equivalent faces are shown enclosed in curly brackets or braces, i.e., in { }. For example, the (110) face, (101) face, (011) face, (##0) face, (#0#) face, and (0##) face are collectively indicated as the {110} faces (the number sign (#) used in the preceding indicates a "1 with an overbar" and thus represents "−1").

Also in the Specification, the term "(1-10) face" indicates the (1*0) face and the term "(1-12) face" indicates the (1*2) face (the asterisk (*) used in the preceding indicates a "1 with an overbar" and thus represents "−1"). Also in the Specification, the term "(11-2) face" indicates the (11♦) face (the diamond symbol (♦) used in the preceding indicates a "2 with an overbar" and thus represents "−2").

The garnet-type solid electrolyte according to an aspect of the invention has at least one crystal face selected from the group consisting of the {110} faces, {112} faces, {100} faces, {102} faces, {312} faces, {521} faces, and {611} faces. A garnet-type solid electrolyte having these crystal faces is entirely unavailable among conventional garnet-type solid electrolytes. As shown in the examples provided below, a garnet-type solid electrolyte having any of the indicated crystal faces has fewer crystal defects than the conventional garnet-type solid electrolytes and has a higher crystallinity. The garnet-type solid electrolyte according to an aspect of the invention may have at least one crystal face selected from group consisting of the (110) face, (1-10) face, (112) face, (1-12) face, and (11-2) face.

The half width of an arbitrarily selected peak in the XRD pattern can be used as an indicator of the crystallinity of the garnet-type solid electrolyte according to the aspects of the invention. Thus, the garnet-type solid electrolyte has a satisfactorily high crystallinity when the half width of the arbitrarily selected peak in the XRD pattern of the garnet-type solid electrolyte is 1 or less. The half width of the arbitrarily selected peak in the XRD pattern is preferably 0.5 or less.

Viewed from the standpoint of crystal face development, in an aspect of the invention the area of the one crystal face or the sum of the areas of the two or more crystal faces selected from the {110} faces, {112} faces, {100} faces, {102} faces, {312} faces, {521} faces, and {611} faces is preferably equal to or larger than 30% of the total surface area of the garnet-type solid electrolyte.

According to an aspect of the invention, the garnet-type solid electrolyte is preferably selected from the group consisting of $Li_7La_3M^1_2O_{12}$ ($M^1$=Zr, Hf, Sn), $Li_{5+x}La_3Zr_xM^2_{2-x}O_{12}$ ($M^2$=Nb, Ta; x=0 to 2), $Li_5La_3M^3_2O_{12}$ ($M^3$=Nb, Ta, Sb, Bi), and $Li_6ALa_2Ta_2O_{12}$ (A=Mg, Ca, Sr, $Sr_{0.5}Ba_{0.5}$, Ba). $Li_7La_3Zr_2O_{12}$ is more preferred among these garnet-type solid electrolytes.

2. The Secondary Battery

The secondary battery according to an aspect of the invention is a secondary battery provided with at least a positive electrode, a negative electrode, and a solid electrolyte interposed between the positive electrode and the negative electrode, and is characterized in that the solid electrolyte is the garnet-type solid electrolyte described above.

FIG. 1 is a diagram that shows an example of the layer structure of a secondary battery according to an aspect of the invention; the diagram schematically illustrates a cross section provided by sectioning in the lamination direction. Secondary batteries according to aspects of the invention are not necessarily limited to only the example. The secondary battery 100 has a positive electrode 6 that includes a positive electrode active material layer 2 and a positive electrode current collector 4, a negative electrode 7 that includes a negative electrode active material layer 3 and a negative electrode current collector 5, and a garnet-type solid electrolyte 1 sandwiched between the positive electrode 6 and the negative electrode 7. The garnet-type solid electrolyte in secondary batteries according to aspects of the invention conforms to the description given above. A detailed description follows for a positive electrode and a negative electrode constituting a secondary battery according to an aspect of the invention and for a separator and a battery case favorably used in aspects of the invention.

(The Positive Electrode)

The positive electrode in a secondary battery according to an aspect of the invention preferably includes a positive electrode active material layer that contains a positive electrode active material, and generally further includes a positive electrode current collector and a positive electrode lead that is connected to the positive electrode current collector. When a secondary battery according to an aspect of the invention is a metal-air battery, an air electrode containing an air electrode layer is provided in place of the aforementioned positive electrode.

(The Positive Electrode Active Material Layer)

The following description concerns the use for the positive electrode of a positive electrode having a positive electrode active material layer. The positive electrode active material used in aspects of the invention is specifically exemplified by $LiCoO_2$, $LiNi_{1/3}Mn_{1/3}Co_{1/3}O_2$, $LiNiPO_4$, $LiMnPO_4$, $LiNiO_2$, $LiMn_2O_4$, $LiCoMnO_4$, $Li_2NiMn_3O_8$, $Li_3Fe_2(PO_4)_3$, and $Li_3V_2(PO_4)_3$. Among these, the use of $LiCoO_2$ as the positive electrode active material is preferred in aspects of the invention.

The thickness of the positive electrode active material layer used in aspects of the invention will vary as a function, for example, of the intended application of the secondary battery, but is preferably in the range from 10 to 250 μm, is particularly preferably in the range from 20 to 200 μm, and is most preferably in the range from 30 to 150 μm.

The average particle diameter of the positive electrode active material is, for example, in the range from 1 to 50 μm, wherein the range from 1 to 20 μm is preferred and the range from 3 to 5 μm is particularly preferred. The bases for these ranges are as follows: the handling properties can deteriorate when the average particle diameter of the positive electrode active material is too small; obtaining a flat and even positive electrode active material layer becomes problematic when the average particle diameter of the positive electrode active material is too large. The average particle diameter of the positive electrode active material can be determined, for example, by measuring the particle diameter of the active material support by Scanning Electron Microscopy (SEM) observation and averaging.

The positive electrode active material layer may contain, for example, an electroconductive material and a binder on an optional basis. The electroconductive material present in the positive electrode active material layer used in aspects of the invention should have the ability to improve the electroconductivity of the positive electrode active material layer, but is not otherwise particularly limited, and can be exemplified by carbon black, for example, acetylene black and ketjen black. The content of the electroconductive material in the positive electrode active material layer will vary with the type of electroconductive material, but is ordinarily in the range from 1 to 10 mass %.

The binder present in the positive electrode active material layer used in aspects of the invention can be exemplified by polyvinylidene fluoride (PVDF) and polytetrafluoroethylene (PTFE). The binder content in the positive electrode active material layer may be the amount that can fix or immobilize the positive electrode active material and so forth, and lower contents are preferred. The binder content is ordinarily in the range from 1 to 10 mass %.

The positive electrode active material layer used in an aspect of the invention may contain an electrolyte for use in a positive electrode. The positive electrode electrolyte can be, for example, a polymer electrolyte, a gel electrolyte, or a solid electrolyte such as a solid oxide electrolyte or a solid sulfide electrolyte.

(The Positive Electrode Current Collector)

The positive electrode current collector used in an aspect of the invention has the function of performing current collection for the previously described positive electrode active material layer. The material of the positive electrode current collector can be exemplified by aluminum, SUS, nickel, iron, and titanium, whereamong aluminum and SUS are preferred. The shape of the positive electrode current collector can be exemplified by foil, plate, sheet, mesh, and so forth, whereamong a foil shape is preferred.

The method of producing the positive electrode used in the aspects of the invention should be a method that can provide the positive electrode that has been described above, but is not otherwise particularly limited. After the positive electrode active material layer has been formed, the positive electrode active material layer may be pressed in order to increase the electrode density.

(The Air Electrode Layer)

The following description concerns the use for the positive electrode of an air electrode having an air electrode layer. The air electrode layer used in aspects of the invention preferably contains at least a catalyst and an electroconductive material. The air electrode layer used in aspects of the invention may additionally contain a binder on an optional basis.

The catalyst used in the air electrode layer can be exemplified by oxygen-active catalysts. The oxygen-active catalysts can be exemplified by the platinum group, e.g., palladium, platinum, and so forth; perovskite-type oxides that contain a transition metal such as cobalt, manganese, iron, and so forth; inorganic compounds that contain an oxide of a noble metal such as ruthenium, iridium, palladium, and so forth; metal-coordinated organic compounds that have a porphyrin skeleton or a phthalocyanine skeleton; and manganese oxide. Viewed from the perspective of a smoother development of the electrode reactions, the aforementioned catalysts are preferably supported on an electroconductive material, infra.

The electroconductive material used in the air electrode layer should exhibit electroconductivity, but is not otherwise particularly limited, and can be exemplified by carbonaceous materials, perovskite-type electroconductive materials, porous electroconductive polymers, and porous metal bodies. In particular, while the carbonaceous material may or may not have a porous structure, it preferably has a porous structure in an aspect of the invention. A porous structure is preferred because the large specific surface area can provide a large reaction field and because a porous structure can also function as a gas diffusion layer. Carbonaceous materials that have a porous structure can be specifically exemplified by mesoporous carbon and so forth. On the other hand, carbonaceous materials that lack a porous structure can be specifically exemplified by graphite, acetylene black, carbon nanotubes, and carbon fiber. The proportion of the electroconductive material in the air electrode layer is in the range, for example, from 65 to 99 mass %, whereamong the range from 75 to 95 mass % is preferred. The bases for the are as follows: when the proportion of the electroconductive material is too small, the reaction field is diminished and a reduction in battery capacity may then be produced; when the proportion of the electroconductive material is too large, the catalyst content is correspondingsly reduced and the development of a satisfactory catalytic function may then not be possible.

It is sufficient for the aforementioned air electrode layer to contain at least a catalyst and an electroconductive material, but it preferably also contains a binder. The binder can be exemplified by PVDF and PTFE and by rubbery resins such as styrene butadiene rubber (SBR rubber). The binder content in the air electrode layer is not particularly limited and, for example, is 30 mass % or less, wherein the range from 1 to 10 mass % is preferred.

The thickness of the air electrode layer will vary as a function, inter alia, of the application of the air battery, but is, for example, in the range from 2 to 500 μm wherein the range from 5 to 300 μm is preferred.

(The Air Electrode Current Collector)

The air electrode current collector used in an aspect of the invention carries out current collection for the air electrode layer. The material of the air electrode current collector should exhibit electroconductivity, but is not otherwise particularly limited, and can be exemplified by stainless steel, nickel, aluminum, iron, titanium, carbon, and so forth. The shape of the air electrode current collector can be exemplified by foil, plate, sheet, and mesh (grid). Among the preceding, the air electrode current collector preferably has a mesh shape in an aspect of the invention because this provides an excellent current collection efficiency. In this case, the mesh-shaped air electrode current collector is ordinarily disposed within the air electrode layer. A secondary battery according to an aspect of the invention may also include a separate air electrode current collector (for example, a current collector foil) that collects the charge that has been collected by a mesh-shaped air electrode current collector. The battery case, infra, may also function as the air electrode current collector in an aspect of the invention. The thickness of the air electrode current collector is, for example, in the range from 10 to 1,000 µm, wherein the range from 20 to 400 µm is preferred.

(The Negative Electrode)

The negative electrode in a secondary battery according to an aspect of the invention preferably includes a negative electrode active material layer that contains a negative electrode active material, and typically further includes a negative electrode current collector and a negative electrode lead connected to the negative electrode current collector.

(The Negative Electrode Active Material Layer)

The negative electrode used in an aspect of the invention contains a negative electrode active material that contains, for example, a metal, an alloy, and/or a carbonaceous material. Metals and alloys usable in the negative electrode active material can be specifically exemplified by alkali metals such as lithium, sodium, potassium, and so forth; Group 2 elements such as magnesium, calcium, and so forth; Group 13 elements such as aluminum and so forth; transition metals such as zinc, iron, and so forth; and compounds and alloys that contain these metals. When an aspect of the invention is a lithium secondary battery, the negative electrode active material should be able to incorporate and release the lithium ion, but is not otherwise particularly limited, and can be exemplified by lithium metal, lithium alloys, lithium-containing metal oxides, lithium-containing metal sulfides, lithium-containing metal nitrides, and carbonaceous materials such as graphite. The negative electrode active material may take the form of a particulate or a thin film or membrane. Lithium-containing alloys can be exemplified by lithium-aluminum alloys, lithium-tin alloys, lithium-lead alloys, and lithium-silicon alloys. Lithium-containing metal oxides can be exemplified by lithium titanium oxide and so forth. Lithium-containing metal nitrides can be exemplified by lithium cobalt nitride, lithium iron nitride, lithium manganese nitride, and so forth. Lithium coated with a solid electrolyte may also be used in the negative electrode active material layer.

The negative electrode active material layer may contain only negative electrode active material or may contain at least one of an electroconductive material and a binder in addition to the negative electrode active material. When, for example, the negative electrode active material is a foil, the negative electrode active material layer may contain only the negative electrode active material. When, on the other hand, the negative electrode active material is a powder, the negative electrode active material layer may contain the negative electrode active material and a binder. The electroconductive material and binder each have the same meaning as described above in the "The positive electrode active material layer" section and "The air electrode layer" section and therefore no further description is provided here. The film thickness of the negative electrode active material layer is not particularly limited and is, for example, in the range from 10 to 100 µm, wherein the range from 10 to 50 µm is preferred.

The negative electrode active material layer may contain an electrolyte for use in the negative electrode. In this case, the electrolyte already described above with reference to the electrolyte for use in the positive electrode may be used as the electrolyte for use in the negative electrode.

(The Negative Electrode Current Collector)

The material and shape of the negative electrode current collector used in aspects of the invention may be the same as described above for the material and shape of the positive electrode current collector.

(The Separator)

The secondary battery according to an aspect of the invention may include an electrolyte solution-impregnated separator between the positive electrode and the negative electrode. The separator can be exemplified by a porous membrane of, for example, polyethylene or polypropylene, and by non-woven fabrics, e.g., a nonwoven resin fabric or a nonwoven fabric of glass fiber.

(The Battery Case)

The secondary battery according to an aspect of the invention typically has a battery case that holds the positive electrode, electrolyte solution, negative electrode, and so forth. The shape of the battery case can be specifically exemplified by coin shaped, disk shaped, cylindrical, and laminate. When according to an aspect of the invention the battery is a metal-air battery, the battery case may be a battery case that is open to the atmosphere or may be a sealed battery case. The open-to-the-atmosphere battery case is a battery case that has a structure that enables satisfactory contact between at least the air electrode layer and the atmosphere. When, on the other hand, the battery case is a sealed battery case, a gas (air) introduction tube and an exhaust tube are preferably disposed in the sealed battery case. The introduced and discharged gas in this case preferably has a high oxygen concentration and more preferably is pure oxygen. In addition, the oxygen concentration is preferably raised during discharge and the oxygen concentration is preferably lowered during charging.

3. The Method of Producing the Garnet-Type Solid Electrolyte

The method according to an aspect of the invention of producing the garnet-type solid electrolyte is a method that produces a garnet-type solid electrolyte containing Li, La, Zr, and O and that characteristically has a step of preparing a lithium-containing compound, a lanthanum-containing compound, and a zirconium-containing compound; a step of mixing the lithium-containing compound, lanthanum-containing compound, and zirconium-containing compound such that a molar ratio among the elements satisfies Li:La:Zr=a:b:c (where a is 120 to 160, b is 1 to 5, and c is 1 to 5); and a step of heating the mixture at a temperature of 400 to 1,200° C.

The aspect of the invention has (1) a step of preparing the starting materials for the garnet-type solid electrolyte, (2) a mixing step, and (3) a heating step. The aspect of the invention is not necessarily limited to only these three steps and in addition to these three steps may have, for example, a step of removing the flux from the mixture after heating. These steps (1), (2), and (3) and other steps are described in sequence herebelow.

3-1. The Step of Preparing the Starting Materials for the Garnet-Type Solid Electrolyte The starting materials that are prepared in this step are a lithium-containing compound, a lanthanum-containing compound, and a zirconium-containing compound. These are described in sequence herebelow.

The lithium-containing compound prepared in this step should be a compound that contains at least the element lithium (Li), but is not otherwise particularly limited. The lithium-containing compound prepared in this step may be either an organic compound or an inorganic compound and may be a hydrate or may be anhydrous. The lithium-containing compound can be specifically exemplified by LiOH, $LiNO_3$, LiCl, $Li_2CO_3$, $Li_2O$, and so forth. A single one of these may be used as the lithium-containing compound, or a mixture of two or more of the preceding may be used as the lithium-containing compound. In an aspect of the invention, the excess lithium-containing compound that exceeds the stoichiometric amount for synthesis of the garnet-type solid electrolyte acts as a flux, containing compound to be prepared is then the sum of the amount that corresponds to the lithium constituent of the garnet-type solid electrolyte and the amount of the lithium-containing compound that acts as a flux.

The lanthanum-containing compound prepared in this step should be a compound that contains at least the element lanthanum (La), but is not otherwise particularly limited. The lanthanum-containing compound prepared in this step may be either an organic compound or an inorganic compound and may be a hydrate or may be anhydrous. The lanthanum-containing compound can be specifically exemplified by $La_2O_3$, $La(OH)_3$, $LaCl_3 \cdot 9H_2O$, $La(NO_3)_3 \cdot 6H_2O$, and so forth. A single one of these may be used as the lanthanum-containing compound, or a mixture of two or more of the preceding may be used as the lanthanum-containing compound.

The zirconium-containing compound prepared in this step should be a compound that contains at least the element zirconium (Zr), but is not otherwise particularly limited. The zirconium-containing compound prepared in this step may be either an organic compound or an inorganic compound and may be a hydrate or may be anhydrous. The zirconium-containing compound can be specifically exemplified by $ZrO_2$, $ZrOCl_2 \cdot 8H_2O$, $Zr(OH)_4$, $ZrO(NO_3)_2 \cdot 2H_2O$, and so forth. A single one of these may be used as the zirconium-containing compound, or a mixture of two or more of the preceding may be used as the zirconium-containing compound.

An auxiliary flux may also be prepared in this step. The auxiliary flux used in an aspect of the invention should be a substance that at least (1) can dissolve the lithium-containing compound, lanthanum-containing compound, and zirconium-containing compound, (2) has a melting point equal to or less than 1,000° C., (3) has a high solubility in water, and (4) is not combustible, but is not otherwise particularly limited. An auxiliary flux denotes a compound that acts only as a flux and does not constitute a starting material for the garnet-type solid electrolyte. The auxiliary flux can be specifically exemplified by NaCl, KCl, $NaNO_3$, $KNO_3$, $Na_2CO_3$, $K_2CO_3$, $Na_2O$, $K_2O$, $MoO_3$, $Li_2MoO_4$, $Na_2MoO_4$, $K_2MoO_4$, $WO_3$, $Li_2WO_4$, $Na_2WO_4$, and $K_2WO_4$. A single one of these may be used as the auxiliary flux or a mixture of two or more may be used as the auxiliary flux.

3-2. The mixing step

This step is a step in which the starting materials described above are mixed such that a molar ratio among the elements satisfies Li:La:Zr=a:b:c. Here, a is 120 to 160, b is 1 to 5, and c is 1 to 5 in the molar ratio. The addition of the lithium-containing compound at about 20 times the stoichiometric amount is a primary characteristic feature of this step. By adding such an excess of the lithium-containing compound, the lithium-containing compound exceeds the stoichiometric amount for synthesis of the garnet-type solid electrolyte acts as a flux, which makes possible the growth of a high-crystallinity solid electrolyte. The lithium mixing ratio a is preferably a=125 to 155 and more preferably is a=130 to 150.

The lanthanum mixing ratio b and the zirconium mixing ratio c can be adjusted as appropriate in conformity to the compositional ratio of the solid electrolyte to be produced. For example, to produce $Li_7La_3Zr_2O_{12}$, preferably b=1.5 to 4.5 and c=1.5 to 4.5 and more preferably b=2 to 4 and c=2 to 4.

An auxiliary flux may also be added to the mixture in this step. In this case, when the total mass of the mixture that contains the lithium-containing compound, lanthanum-containing compound, zirconium-containing compound, and the auxiliary flux is set to 100 mass %, the total content in the mixture of the compound or compounds acting as a flux is preferably from 5 to 95 mass %. This "compound or compounds acting as a flux" refers to (1) the auxiliary flux and (2) with reference to the lithium-containing compound or compounds, any lithium-containing compound that corresponds to lithium that does not constitute the garnet-type solid electrolyte.

When the total content of the compound or compounds acting as a flux is less than 5 mass %, too little flux is present and the solutes then cannot be adequately dissolved, which may result in poor crystal face development and an inability to grow a high-crystallinity solid electrolyte. Too much flux is present when the total content of the compound or compounds acting as a flux exceeds 95 mass %, and as a result a solid electrolyte with the intended composition may not be obtained, the production efficiency may be low due to a low yield, and the crystals may not be adequately developed. In this step, when the total mass of the mixture is 100 mass %, the total content in the mixture of the compound or compounds acting as a flux in this step is preferably 5 to 91 mass % and more preferably is 5.5 to 91 mass %.

The mixing method for preparing the mixture should be a method capable of providing a uniform mixture, but is not otherwise particularly limited, and conventional methods can be used here. Specific examples are mixing with a mortar, stirring and mixing by mechanical milling, stirring and mixing with a planetary mixer, and stirring and mixing with a vibrating device or a shaker. Among these mixing methods, there are no particular limitations on mechanical milling as long as the particular method can mix the starting material mixture while imparting mechanical energy thereto, and examples here are ball mills, turbomills, mechanofusion, disk mills, and so forth.

3-3. The Heating Step

This step is a step of heating the mixture obtained in the mixing step at a temperature of 400 to 1,200° C. Heating is inadequate when the heating temperature is less than 400° C., which creates the risk that crystallization will not proceed satisfactorily. When the heating temperature exceeds 1,200° C., the reactions will go too far due to the overly high temperature and crystals having a crystal structure different from a garnet-type structure may be produced. The heating temperature is preferably from 450 to 1,100° C. and more preferably is from 500 to 1,000° C.

The heating method should be capable of heating into the temperature range described above, but is not otherwise particularly limited. While the heating atmosphere is not particularly limited, heating in the atmosphere and heating in an oxygen atmosphere are preferred. The heating method can be specifically exemplified by heating with an electric furnace, heating with a heat gun, heating with an area heater or a wire heater, heating by exposure to a plasma, infrared heating, arc heating, induction heating, laser heating, and so forth.

3-4. Other Steps

After the heating step, a step may be carried out in which the flux is removed from the mixture. When the flux is water soluble, crystals of the garnet-type solid electrolyte according to the invention can be obtained by washing the mixture with, e.g., distilled water. When the flux is oil soluble, crystals of the garnet-type solid electrolyte according to the invention can be obtained by washing with an appropriately selected solvent that does not cause a loss in crystallinity.

EXAMPLES

The invention is more specifically described below using examples and comparative examples; however, the invention is not limited to only these examples.
1. Production of the Garnet-Type Solid Electrolyte

Example 1

First, each of the following were prepared and dry mixed with a mortar to uniformity: 10.755 g lithium hydroxide monohydrate ($LiOH.H_2O$) as the lithium-containing compound, 0.894 g lanthanum(III) oxide ($La_2O_3$) as the lanthanum-containing compound, 0.452 g zirconium(IV) oxide ($ZrO_2$) as the zirconium-containing compound, and 0.963 g sodium chloride (NaCl) as auxiliary flux. Thus, mixing was carried out such that a molar ratio among the lithium, lanthanum, and zirconium elements satisfies Li:La:Zr=140:3:2. The amount of the lithium hydroxide monohydrate used that was in excess over the stoichiometric amount required for the synthesis of $Li_7La_3Zr_2O_{12}$ serves as a flux. The amount of lithium hydroxide monohydrate serving as a flux is 10.755×{(140−7)/140}=10.217 g. When the mass of the entire mixture is 100 mass %, the content of the compounds acting as a flux in this mixture is therefore (0.963+10.217)/(10.755+0.894+0.452+0.963)=85.6 mass %. The mixture was then placed in a crucible, heated to 900° C. in an electric furnace, and held there for 10 hours. This was followed by gradual cooling at 200° C./h to 500° C. and then spontaneous cooling. Finally, the mixture was washed with purified water to remove the flux in the mixture and yield the garnet-type solid electrolyte of Example 1.

Comparative Example 1

First, each of the following were prepared and mixed to uniformity using the same means as in Example 1: 1.076 g lithium hydroxide monohydrate as the lithium-containing compound, 1.789 g lanthanum(III) oxide as the lanthanum-containing compound, 0.902 g zirconium(IV) oxide as the zirconium-containing compound, and 1.925 g sodium chloride as flux. Thus, mixing was carried out such that a molar ratio among the lithium, lanthanum, and zirconium elements satisfies Li:La:Zr=7:3:2. The lithium hydroxide monohydrate used in Comparative Example 1 is approximately equal to the stoichiometric amount required for the synthesis of $Li_7La_3Zr_2O_{12}$. When the mass of the entire mixture is 100 mass %, the content of the compound acting as a flux in the mixture is therefore 1.925/(1.076+1.789+0.902+1.925)=33.8 mass %. Heating, cooling, and washing were then carried out as in Example 1 to obtain the garnet-type solid electrolyte of Comparative Example 1.

Comparative Example 2

First, each of the following were prepared and mixed to uniformity using the same means as in Example 1: 2.151 g lithium hydroxide monohydrate as the lithium-containing compound, 1.789 g lanthanum(III) oxide as the lanthanum-containing compound, 0.902 g zirconium(IV) oxide as the zirconium-containing compound, and 1.925 g sodium chloride as auxiliary flux. Thus, mixing was carried out such that a molar ratio among the lithium, lanthanum, and zirconium elements satisfies Li:La:Zr=14:3:2. The amount of the lithium hydroxide monohydrate used that was in excess over the stoichiometric amount required for the synthesis of $Li_7La_3Zr_2O_{12}$ serves as a flux. The amount of lithium hydroxide monohydrate serving as a flux is 2.151×{(14−7)/14}=1.076 g. When the mass of the entire mixture is 100 mass %, the content of the compounds acting as a flux in this mixture is therefore (1.925+1.076)/(2.151+1.789+0.902+1.925)=44.3 mass %. Heating, cooling, and washing were then carried out as in Example 1 to obtain the garnet-type solid electrolyte of Comparative Example 2.

Comparative Example 3

First, each of the following were prepared and mixed to uniformity using the same means as in Example 1: 4.302 g lithium hydroxide monohydrate as the lithium-containing compound, 3.578 g lanthanum(III) oxide as the lanthanum-containing compound, 2.708 g zirconium(IV) oxide as the zirconium-containing compound, and 3.851 g sodium chloride as auxiliary flux. Thus, mixing was carried out such that a molar ratio among the lithium, lanthanum, and zirconium elements satisfies Li:La:Zr=14:3:3. The amount of the lithium hydroxide monohydrate used that was in excess over the stoichiometric amount required for the synthesis of $Li_7La_3Zr_2O_{12}$ serves as a flux. The amount of lithium hydroxide monohydrate serving as a flux is 4.302×{(14−7)/14}=2.151 g. When the mass of the entire mixture is 100 mass %, the content of the compounds acting as a flux in this mixture is therefore (3.851+2.151)/(4.302+3.578+2.708+3.851)=41.6 mass %. Heating, cooling, and washing were then carried out as in Example 1 to obtain the garnet-type solid electrolyte of Comparative Example 3.

Comparative Example 4

First, each of the following were prepared and mixed to uniformity using the same means as in Example 1: 1.167 g lithium hydroxide monohydrate and 8.333 g lithium chloride (LiCl) as lithium-containing compounds, 0.970 g lanthanum (III) oxide as the lanthanum-containing compound, and 0.489 g zirconium(IV) oxide as the zirconium-containing compound. Thus, mixing was carried out such that a molar ratio among the lithium, lanthanum, and zirconium elements satisfies Li:La:Zr=14:3:2. The amount of the lithium-containing compounds used that was in excess over the stoichiometric amount required for the synthesis of $Li_7La_3Zr_2O_{12}$ serves as a flux. The approximate amount of the lithium-containing compounds serving as a flux is (1.167+8.333)×{(14−7)/14}=4.8 g. When the mass of the entire mixture is 100 mass %, the approximate content of the compounds acting as a flux in this mixture is therefore (4.8)/(1.167+8.333+0.970+0.489)=44 mass %. Heating, cooling, and washing were then carried out as in Example 1 to obtain the garnet-type solid electrolyte of Comparative Example 4.

Comparative Example 5

The garnet-type solid electrolyte of Comparative Example 5 was produced by the same method as described in the previously referenced JP-A-2010-045019. Thus, each of the following were first prepared and mixed using an automated mortar to produce a starting powder: 1.90 g lithium carbonate ($Li_2CO_3$) as the lithium-containing compound, 3.79 g lanthanum(III) hydroxide ($La(OH)_3$) as the lanthanum-containing compound, and 1.64 g zirconium(IV) oxide ($ZrO_2$) as the zirconium-containing compound. In Comparative Example 5, mixing was carried out such that a molar ratio among the lithium, lanthanum, and zirconium elements satisfies Li:La:Zr=3.85:3:2, and an auxiliary flux was not used.

The starting powder was heated at 1° C./min to 900° C. and held there for 6 hours. After heating, the powder was recovered, again ground for 30 minutes with an automated mortar, and thereafter heated at 1° C./min to 1,125° C. and held there for 6 hours (first heat treatment). After the first heat treatment, the powder was recovered and was ground for 1 hour with an automated mortar and was then passed through a sieve with an aperture of 45 μm. The sieved powder was press molded with a die to make a pellet and the pellet was buried in the parent powder (powder after the first heat treatment) and heated at 1° C./min to each of the indicated temperatures and held for the indicated times (second heat treatment) to give the garnet-type solid electrolyte of Comparative Example 5.

2. Analysis of the Garnet-Type Solid Electrolytes 2-1. XRD Analysis of the Garnet-Type Solid Electrolytes Powder x-ray diffraction (XRD) measurements were carried out on the garnet-type solid electrolytes of Example 1 and Comparative Examples 1 to 4. The measurements used a powder x-ray diffraction instrument (Miniflex II, Rigaku). CuK$_\alpha$ radiation was used for the measurement; the acceleration voltage was 30 kV; and the applied current was 15 mA.

Figure 2:
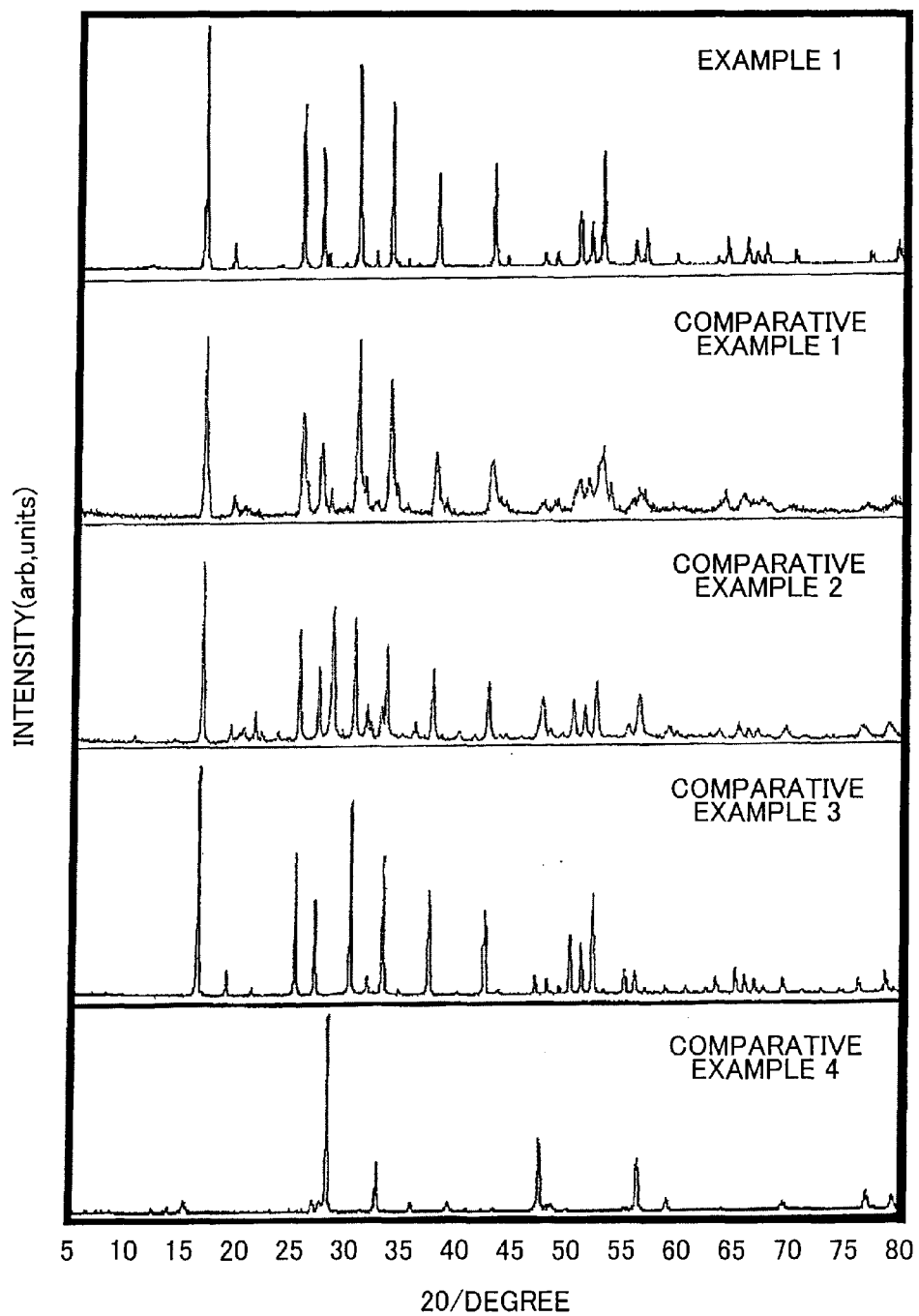
FIG. 2 contains x-ray diffraction (XRD) patterns of the garnet-type solid electrolytes of Example 1 and Comparative Examples 1 to 4.

FIG. 2 contains the XRD solid electrolytes of Example 1 and Comparative Examples 1 to 4. The XRD pattern of Comparative Example 4 will be considered first. The XRD pattern of a garnet-type compound has a single sharp peak in the range 2θ=15.8 to 17.5°. However, such a diffraction peak is entirely absent from the XRD pattern for Comparative Example 4. This result indicates that $Li_7La_3Zr_2O_{12}$ could not have been synthesized in Comparative Example 4.

The XRD patterns for Example 1 and Comparative Examples 1 to 3 will now be considered. All of these XRD patterns have a single sharp peak in the range 2θ=15.8 to 17.5°. In addition to this diffraction peak, the XRD patterns in Comparative Examples 1 and 2 present a characteristic peak at 2θ=28°. In addition, the XRD pattern of Comparative Example 3 presents weak diffraction peaks at 2θ=22°, 50°, 58°, and 61°. On the other hand, the XRD pattern for Example 1 is entirely free of diffraction peaks at 2θ=22°, 28°, 50°, 58°, and 61°. These results show that an impurity phase is present in the garnet-type solid electrolytes of Comparative Examples 1 to 3, while in contrast to this also showing that an impurity phase is not present in the garnet-type solid electrolyte of Example 1.

2-2. SEM Observation of the Garnet-Type Solid Electrolytes

Scanning Electron Microscopy (SEM) observations were carried out on the garnet-type solid electrolyte crystals of Example 1 and Comparative Examples 1 to 5. With regard to the SEM observation conditions, the SEM observations were carried out using a scanning electron microscope (JCM-5700 from JEOL) at a magnification of 2,000 to 50,000× at an acceleration voltage of 15 kV.

FIGS. 4A to 4E respectively contain the SEM images of the garnet-type solid electrolytes of Comparative Examples 1 to 5. As may be understood from FIGS. 4A to 4C, in the case of the garnet-type solid electrolytes of Comparative Examples 1 to 3, the crystal faces are entirely undeveloped and a rounded shape is assumed on the whole. As may be understood from FIG. 4D, in the case of the garnet-type solid electrolyte of Comparative Example 4, many needle-shaped crystals and plate-shaped crystals are present and the shapes are completely different from the crystals of the garnet-type solid electrolyte according to Example 1, vide infra. Furthermore, as may be understood from FIG. 4E, in the case of the garnet-type solid electrolyte of Comparative Example 5, the sizes and shapes of the crystals are nonuniform and crystallization is thus shown to be nonuniform.

Figure 3A:
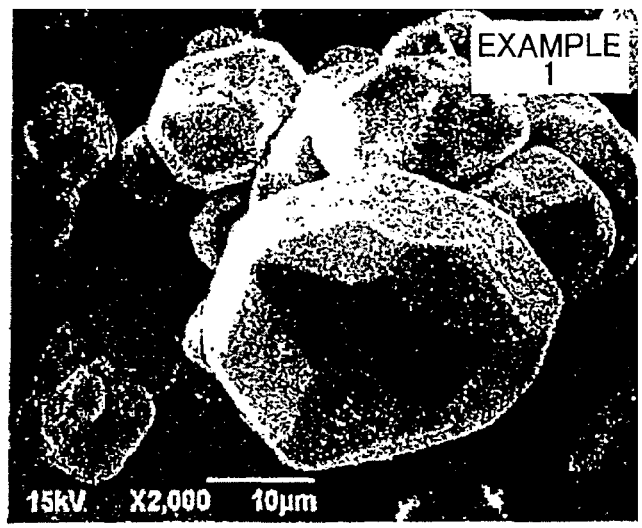
FIG. 3 contains a scanning electron microscope (SEM) image of the garnet-type solid electrolyte of Example 1.
Figure 3B:
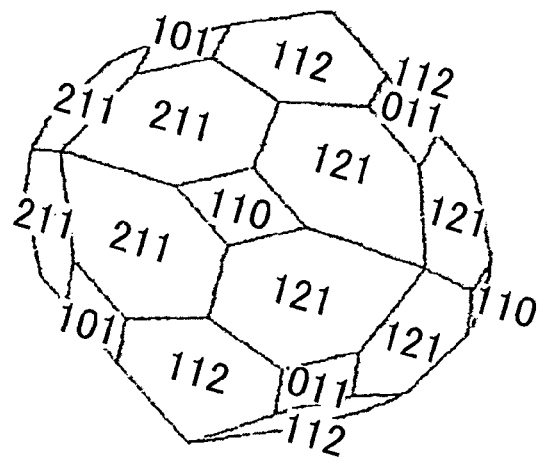
Figure 4A:
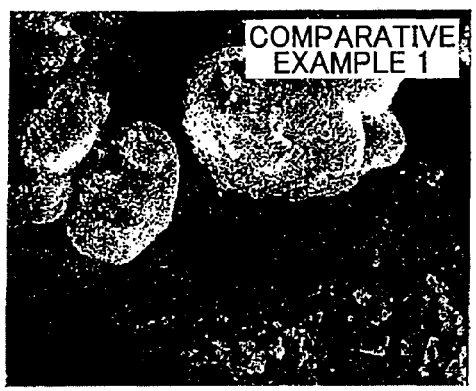
FIG. 4 contains SEM images of the garnet-type solid electrolytes of Comparative Examples 1 to 5.
Figure 4B:
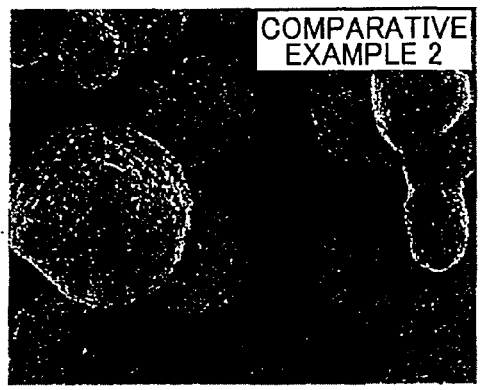
Figure 4C:
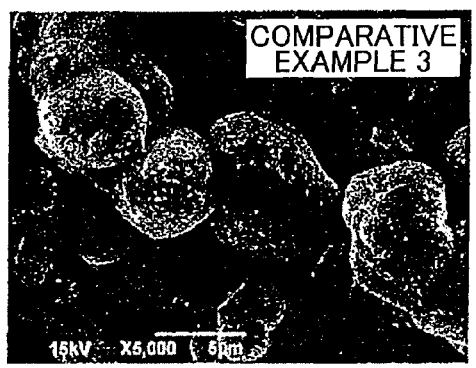
Figure 4D:
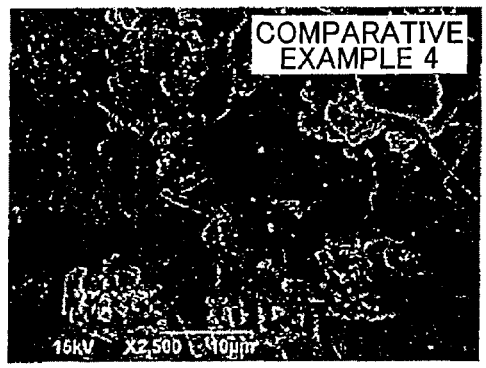
Figure 4E:
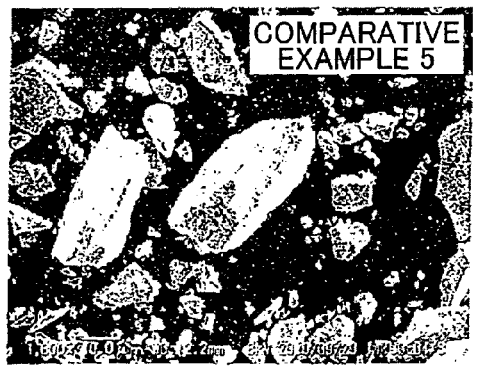

FIG. 3A contains the SEM image of the garnet-type solid electrolyte of Example 1. As may be understood from this figure, the garnet-type solid electrolyte of Example 1 presents well developed crystal faces and a very high crystallinity. FIG. 3B is a crystal face analysis diagram obtained from the SEM image of FIG. 3A. As may be understood from the diagram, the garnet-type solid electrolyte of Example 1 has at least a (110) face and a (112) face. Moreover, the demonstration that, as may be understood from FIG. 3A, the garnet-type solid electrolyte of Example 1 exhibits a very high crystallinity, and the demonstration that, as may be understood from FIG. 3B, the garnet-type solid electrolyte of Example 1 has a (10-1) face and a (01-1) face, which belong to the family of faces equivalent to the (1-10) face, a (21-1) face, which belongs to the family of faces equivalent to the (1-12) face, and a (-12-1) face and a (2-1-1) face, which belong to the family of faces equivalent to the (11-2) face, support the inference that the garnet-type solid electrolyte of Example 1 has all of the following as crystal faces: the (1-10) face, the (1-12) face, and the (11-2) face. The preceding thus demonstrates that Example 1, which used a molar ratio among the lithium, lanthanum, and zirconium elements satisfying Li:La:Zr=140:3:2 and which used a mixture in which the proportion of compounds acting as flux was 85.6 mass %, produces an $Li_7La_3Zr_2O_{12}$ crystal having a very high crystallinity and a very high purity and having all of the following as crystal faces: the (110) face, (1-10) face, (112) face, (1-12) face, and (11-2) face.

The invention claimed is:

1. A method of producing a garnet-type solid electrolyte suitable for use in a lithium battery wherein the electrolyte is represented by a composition formula $Li_7La_3Zr_2O_{12}$ and has (110) face, (1-10) face, (112) face, (1-12) face, and (11-2) face as a crystal face, the method comprising:
   a preparation step of preparing a lithium-containing compound, a lanthanum-containing compound, and a zirconium-containing compound;
   a mixing step of obtaining a mixture by mixing the lithium-containing compound, lanthanum-containing compound, and zirconium-containing compound such that a molar ratio among the elements satisfies Li:La:Zr=a:b:c, where a is from 120 to 160, b is from 1 to 5, and c is from 1 to 5; and
   a heating step of heating the mixture at from 400 to 1,200° C.

2. The production method according to claim 1, wherein the molar ratio satisfies Li:La:Zr=a:b:c, where a is from 125 to 155, b is from 1 to 5, and c is from 1 to 5.

3. The production method according to claim 2, wherein the molar ratio satisfies Li:La:Zr=a:b:c, where a is from 130 to 150, b is from 1 to 5, and c is from 1 to 5.

4. The production method according to claim 1, wherein b is 1.5 to 4.5 and c is 1.5 to 4.5 in the molar ratio.

5. The production method according to claim 4, wherein b is 2 to 4 and c is 2 to 4 in the molar ratio.

6. The production method according to claim 1, wherein an auxiliary flux is further added in the mixing step, and when a total mass of the mixture containing the lithium-containing compound, the lanthanum-containing compound, the zirconium-containing compound, and the auxiliary flux is set to 100 mass %, a total content in the mixture of a compound or compounds acting as a flux is 5 to 95 mass %.

7. The production method according to claim 6, wherein the total content is 5 to 91 mass %.

8. The production method according to claim 7, wherein the total content is 5.5 to 91 mass %.

9. The production method according to claim 1, wherein the mixture is heated at 450 to 1,100° C. in the heating step.

10. The production method according to claim 9, wherein the mixture is heated at 500 to 1,000° C. in the heating step.

* * * * *